July 31, 1923.

H. MINER

VEHICLE TURNING SIGNAL

Filed Jan. 17, 1921

1,463,331

INVENTOR.
HARRY MINER.
BY HIS ATTORNEY
James F. Williamson

Patented July 31, 1923.

1,463,331

UNITED STATES PATENT OFFICE.

HARRY MINER, OF MINNEAPOLIS, MINNESOTA.

VEHICLE TURNING SIGNAL.

Application filed January 17, 1921. Serial No. 437,798.

*To all whom it may concern:*

Be it known that I, HARRY MINER, a citizen of the United States, residing at Minneapolis, in the county of Hennepin and State of Minnesota, have invented certain new and useful Improvements in Vehicle Turning Signals; and I do hereby declare the following to be a full, clear, and exact description of the invention, such as will enable others skilled in the art to which it appertains to make and use the same.

This invention relates to a signaling device and particularly to such a device adapted to be carried on an automobile and to be projected at each side thereof in position to be seen by the drivers of adjacent machines to inform them of the intention of the driver to turn the machine.

It is an object of the invention to construct such a device of extreme simplicity and one which can either be attached to standard types of cars or can be built into the car when the same is assembled. It is a further object of the invention to provide the signaling device with suitable lights which will be automatically illuminated by very simple mechanism when the signal is projected at one side or the other of the automobile. These and further objects and advantages of the invention will be apparent from the following description made in connection with the accompanying drawings in which like reference characters refer to the same parts throughout the different views, and, in which—

Figure 1:
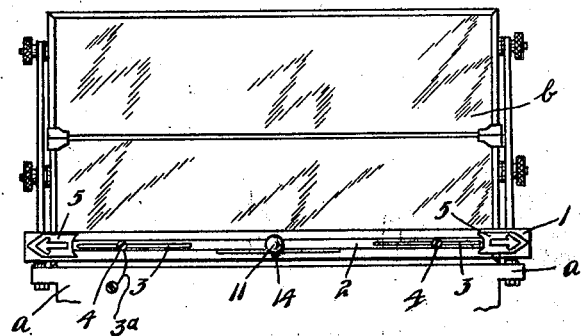
Fig. 1 is a view in elevation of the front part of the interior of an automobile showing the device applied thereto.

Referring to the drawings, particularly Fig. 1, the letter *a* represents the upper part of the frame of an automobile forming the cowl or dash thereof upon which is supported a usual wind shield *b*. The signaling device, which is illustrated as mounted upon a panel or plate 1, is shown in Fig. 1 as supported at the lower portion of the wind shield. It will be understood, however, that the same could also be supported just below the wind shield and along the upper portion of the cowl or dash, just above the instruments which are usually mounted in said dash.

Figure 2:
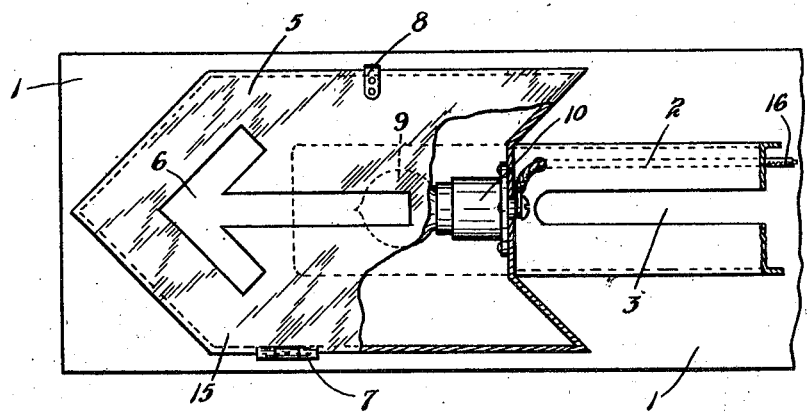
Fig. 2 is an enlarged view in elevation of one end of the device.
Figure 3:
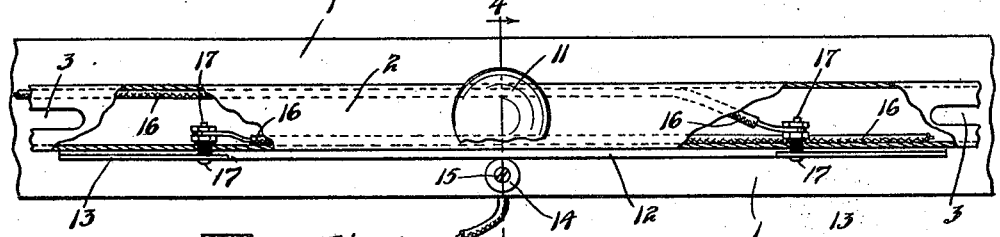
Fig. 3 is a view of the central portion of the device.
Figure 4:
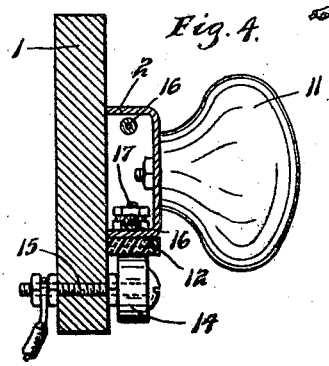
Fig. 4 is a section taken on the line 4—4 of Fig. 3, looking in the direction of the arrows.

Mounted on the supporting panel 1, is a channel-shaped bar 2, preferably made of light metal, and which is provided near each end with central longitudinally extending slots 3 into which extend suitable fastening means, illustrated as headed screws 4 which bar is joined by an electrical connection 3ª to the metal frame of the car which is shown as supporting the wind shield. The bar 2 carries at each end a signal member 5, which, as illustrated, comprises a box of elongated arrow head shape, preferably made of thin metal, which box is shown as provided with a front aperture 6 also of arrow head shape. As shown in Fig. 2, the said box has its front or top portion formed as a hinged lid adapted to open on hinges 7 and retained in closed position by a suitable catch 8. This top portion of the box will be of some bright or readily distinguishable color, such as red or bright yellow. The signal portions 5, comprising the said boxes, are equipped with suitable lights 9 disposed in sockets 10 of any convenient and ordinary type. The inside of the box will be preferably covered with white enamel or other good reflecting surface and the aperture 6 will be covered with some colored transparent material, such as red glass or celluloid.

The bar 2 is provided at the central portion with a knob 11, and said bar also carries on its under surface a thin fiber plate 12, which extends to some distance at each side of the center and has thin metal plates 13 inserted therein at each end, so that their surfaces are flush with the surfaces of said plate. A roller member 14, of suitable conducting metal, is mounted on a journal portion of a bolt 15, which extends through the panel 1 and is rigidly secured therein by suitable check nuts. The roller 14 is retained on the bolt by a head formed thereon and is adapted to rotate on the bolt. An electrical conductor or wire member is attached to the bolt 15 at the rear of the panel 1 and this conductor is adapted to be connected to one side of the battery, usually carried by the automobile. A suitable electric conductor 16 or wire passes from each of the lamp sockets 10 through the inside of the bar 2 to a position back of the metal plate 13 most remote from said lamp, and these conductors 16 are connected to said plates by bolts 17 which are insulated by fiber sleeves where they pass through the bar 2.

While the panel 1 has been shown of rather heavy section, as made of wood, it may be understood that the same may be made of light metal, in which case the bolt 15 would have to be insulated therefrom. It will also be understood that, while the device as illustrated, is shown in the form of an attachment capable of being applied to practically all types of automobiles, the same could also be placed on the machine when the same is built, in which case the bar 2 could be arranged to slide directly along the top of the dash, which dash would then take the place of panel 1.

When the driver of the automobile wishes to indicate that he is about to turn to the left, he will slide the bar 2 to the left by taking hold of knob 11 and the signal 5 will then be projected out to the side of the machine, which will indicate to other drivers in the rear his attention to turn. A movement of the device to the right will also, in the same manner, indicate that the driver is about to make a right turn. The lights and transparent opening 6 are provided so that the device will be efficient at night. It will be seen that when the device is moved to the left, the roller 14 will contact with the metal plate 13, which will then be moved into contact therewith and this plate is connected to the light in the signal at the left hand of the bar. The return circuit to the battery will be made through the bar 2 and the frame of the machine in the usual manner. It will thus be seen that the proper light will be lighted when the device is moved in either direction to project the signals at the sides of the vehicle.

The device is extremely simple and involves no complicated operating gearing or electrical contact apparatus. The same can be very cheaply constructed and quickly and easily applied to a standard type of automobile. It will, of course, be understood that various changes in the form, arrangement and details of the device can be made without departing from the scope of applicant's invention, which, generally stated, consists in the matter shown and described and set forth in the appended claims.

What is claimed is:—

1. A signal device having in combination, a bar adapted to extend substantially across the body of an automobile adjacent to the wind shield, a signal arranged for illumination carried at each end of the bar, said bar having longitudinal slots formed therein, retaining means passing through said slots, and means for sliding said bar on said retaining means to project the signals at one side or the other of the automobile, a circuit making contact below and engaging said bar and spaced contacts carried by said bar adapted to be brought into engagement with said contact as the bar is moved to one side or the other.

2. A signal device for a vehicle having in combination, a channel shaped bar adapted to extend substantially across the body of the vehicle adjacent the front portion thereof, a signal carried at each end of the bar, lights in said signals, a single operating means by which said bar is adapted to be moved longitudinally to project the signals at one side or the other of the vehicle, and means for automatically lighting said lights when the bar is so moved comprising spaced metal plates carried at the bottom of said bar, and a roller disposed below said bar with which said plates contact.

3. A signal device for an automobile comprising a channel-shaped bar extending substantially across the body of the automobile adjacent the wind shield, a signal carried at each end of the bar comprising a box member, a light in each of said box members, means for moving said bar longitudinally to project the signals at one side or the other of an automobile, a fiber strip attached to the lower side of the central portion of said bar and having spaced metal plates inserted therein, an electrically connected roller member journaled centrally beneath said bar with which said fiber strip and metal plates are adapted to contact as said bar is moved, and an electrical conductor connected to each of said lights and to the said metal plate most remote therefrom and housed inside of said bar.

4. A signal device for automobiles having in combination, a channel-shaped bar adapted to extend substantially across the body of an automobile adjacent the wind shield, the bar being disposed with its open side disposed away from the driver of the car, spaced slots formed in the bottom of said channel-shaped bar, retaining means passing through said slots, and means carried by said bar for moving the same longitudinally on said retaining means, casings forming signals at each end of said bar, lamps in said casings, and means for lighting said lamps when the bar is reciprocated.

In testimony whereof I affix my signature.

HARRY MINER.